US00RE36107E

United States Patent [19]

Smith et al.

[11] E

Patent Number: Re. 36,107

[45] Reissued Date of Patent: Feb. 23, 1999

[54] MANUALLY ADJUSTABLE HOUSING PORTIONS FOR ACTUATING AN ELECTRICAL APPLIANCE SWITCH

[75] Inventors: James F. Smith, Louisville; Wesley A. Schroeder, Seville, both of Ohio

[73] Assignee: GMI Holdings, Inc., Alliance, Ohio

[21] Appl. No.: 382,081

[22] Filed: Feb. 1, 1995

Related U.S. Patent Documents

Reissue of:

[64] Patent No.: 5,183,982
Issued: Feb. 2, 1993
Appl. No.: 588,374
Filed: Sep. 26, 1990

[51] Int. Cl.[6] ..... H01H 9/06; A47L 11/40

[52] U.S. Cl. ..... 200/61.85; 200/332.2

[58] Field of Search ..... 200/5 B, 5 E, 200/52 R, 61.85, 332.2, 293.1, 302.1–302.3, 329.1, 332.1; 15/328, 329, 330, 344

[56] References Cited

U.S. PATENT DOCUMENTS

| | | | |
|---|---|---|---|
| 2,699,509 | 1/1955 | Lee et al. | 200/293.1 X |
| 3,334,370 | 8/1967 | Boyd | 15/327.2 |
| 3,530,319 | 9/1970 | Larkin | 310/50 |
| 3,609,491 | 9/1971 | Swanke et al. | 318/252 |
| 3,997,968 | 12/1976 | Czerner et al. | 30/43.92 |
| 4,158,120 | 6/1979 | Pawlowski | 200/330 |
| 4,229,629 | 10/1980 | Pawlowski | 200/303 |
| 4,284,865 | 8/1981 | Nicholson | 200/332.2 |
| 4,384,180 | 5/1983 | Meijer et al. | 200/52 R |
| 4,513,470 | 4/1985 | Toya | 15/328 |
| 4,520,256 | 5/1985 | Doyle | 219/225 |
| 4,538,971 | 9/1985 | Miller et al. | 417/423.2 |
| 4,592,144 | 6/1986 | Tolbert et al. | 30/394 |
| 4,636,230 | 1/1987 | Fan | 55/274 |
| 4,644,606 | 2/1987 | Luerken et al. | 15/330 |
| 4,710,599 | 12/1987 | Motodate et al. | 200/61.85 |
| 4,810,855 | 3/1989 | Dassi et al. | 219/474 |
| 4,845,803 | 7/1989 | King | 15/339 |
| 4,847,454 | 7/1989 | Hiruma | 200/61.85 |
| 4,981,121 | 1/1991 | Tani | 123/179.1 |
| 5,047,597 | 9/1991 | Jailor | 200/5 B |

*Primary Examiner*—J. R. Scott
*Attorney, Agent, or Firm*—Leydig, Voit & Mayer, Ltd.

[57] ABSTRACT

An improved switch assembly for an electrical appliance is provided which is easily manipulated when the appliance assumes a variety of operating modes. The switch assembly includes a slidably mounted control unit for opening and closing a switch, the latter being concealed within a housing for the appliance and disposed within an electric circuit for the appliance. The control unit is provided with a plurality of exposed, finger-engageable surfaces to effect selective movement of the unit.

15 Claims, 5 Drawing Sheets

Fig. 8
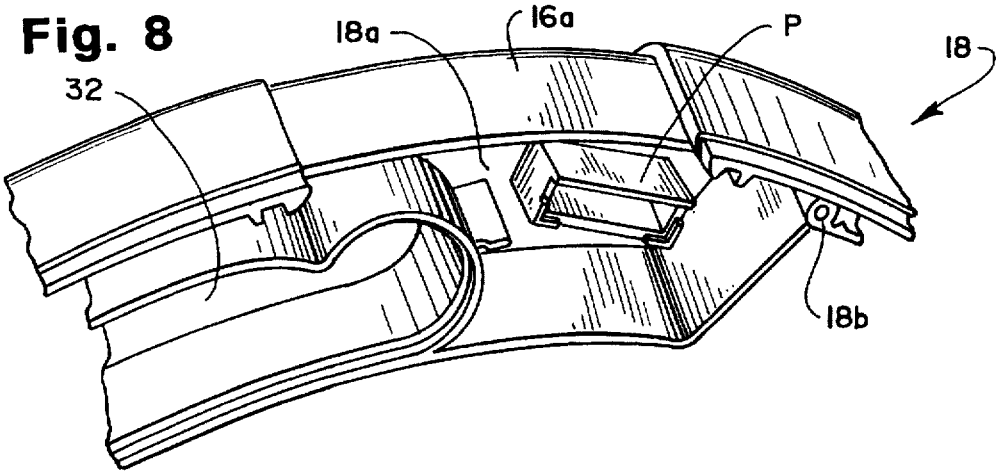
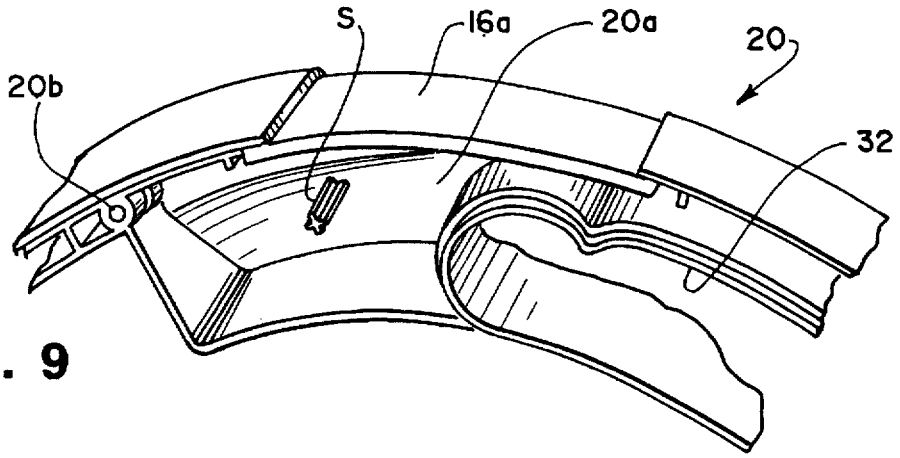
Fig. 9
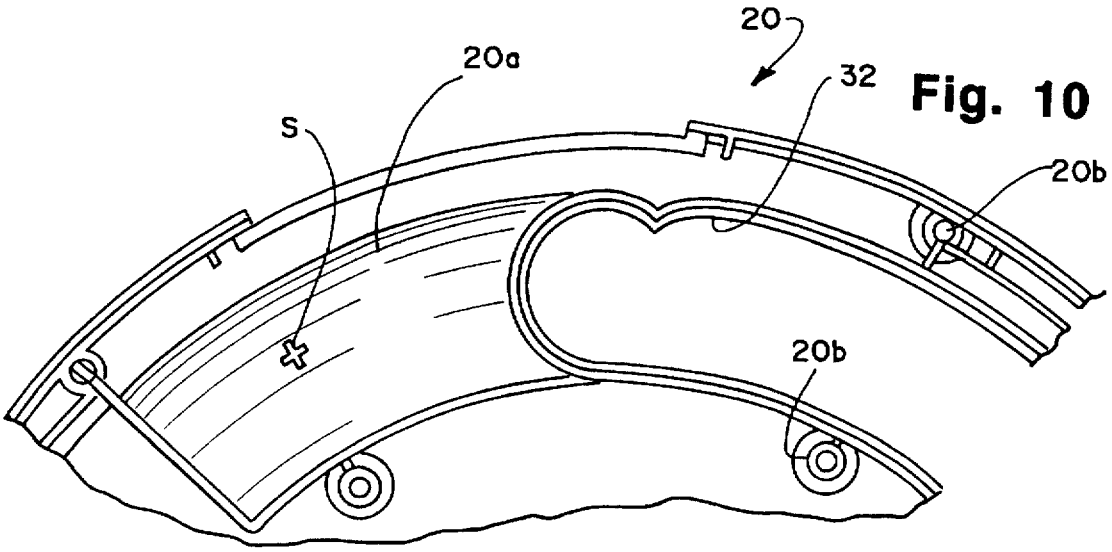
Fig. 10

MANUALLY ADJUSTABLE HOUSING PORTIONS FOR ACTUATING AN ELECTRICAL APPLIANCE SWITCH

Matter enclosed in heavy brackets [ ] appears in the original patent but forms no part of this reissue specification; matter printed in italics indicates the additions made by reissue.

FIELD OF THE INVENTION

This invention relates to an electrical appliance and a switch assembly therefor. The appliance in question is adapted to assume various orientations or modes, thus, the switch assembly must be readily accessible for manual manipulation when in any mode of operation.

DESCRIPTION OF PRIOR ART

There are a variety of electrical appliances which are capable of assuming various operational modes (e.g. acting alone or in combination with another unit). In such appliances the switch assembly connected to a source of power is oftentimes not readily accessible for manual manipulation when operating in the various modes. Such switch assemblies are normally of complex design and are awkward and difficult to install and servicing requires substantial disassembly of the appliance. The location of prior switch assemblies on such appliances is such that they are susceptible to being damaged or accidentally manipulated when the appliance is subjected to normal handling.

OBJECTS OF THE INVENTION

Accordingly, it is an object of this invention to provide an improved electrical appliance and switch assembly therefor which effectively overcome the aforementioned shortcomings besetting the prior art.

It is a further object of this invention to provide an improved switch assembly which is of simple, inexpensive, yet durable construction and embodies a minimum number of components.

Other objects, advantages and features of this invention will become apparent from the description, and appended claims, and accompanying drawings.

SUMMARY OF THE INVENTION

In accordance with one embodiment of this invention, an electrical appliance is provided which includes a housing formed of a pair of complemental, interfitting sections, an electrical motor, and a switch assembly therefor both being disposed within the housing. The switch assembly includes an adjustable switch disposed within an electrical circuit for the motor and a control means operatively connected to the switch and selectively adjusted manually between on and off positions., Adjustment of the switch is responsive to the manual manipulation of the control means. The control means includes angularly disposed first and second finger-engageable exposed surfaces. The first surface is readily accessible when the appliance is in a first operating mode and the second surface is readily accessible when the appliance is in a second operating mode. The switch is retained within the housing by the coaction of cooperating segments of the housing sections when the latter are in interfitting relation.

BRIEF DESCRIPTION OF THE DRAWINGS

For a more complete understanding of this invention, reference should be made to the accompanying drawings wherein:

FIG. 8 is a fragmentary, perspective view of an interior portion of one housing section in which the switch is disposed.

FIG. 9 is similar to FIG. 8 but of the other housing section.

FIG. 10 is a fragmentary elevational view of the interior portion of the housing section of FIG. 9.

DETAILED DESCRIPTION OF THE DRAWINGS

Figure 2:
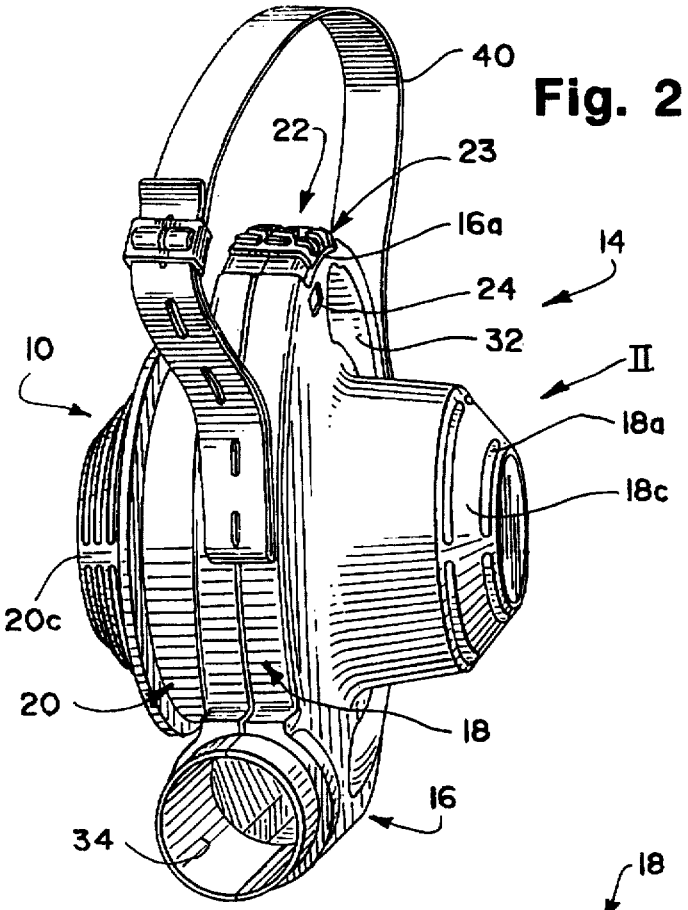
FIG. 2 is a perspective view of the appliance of FIG. 1 functioning per se in a blower mode and showing the discharge side of the appliance.
Figure 1:
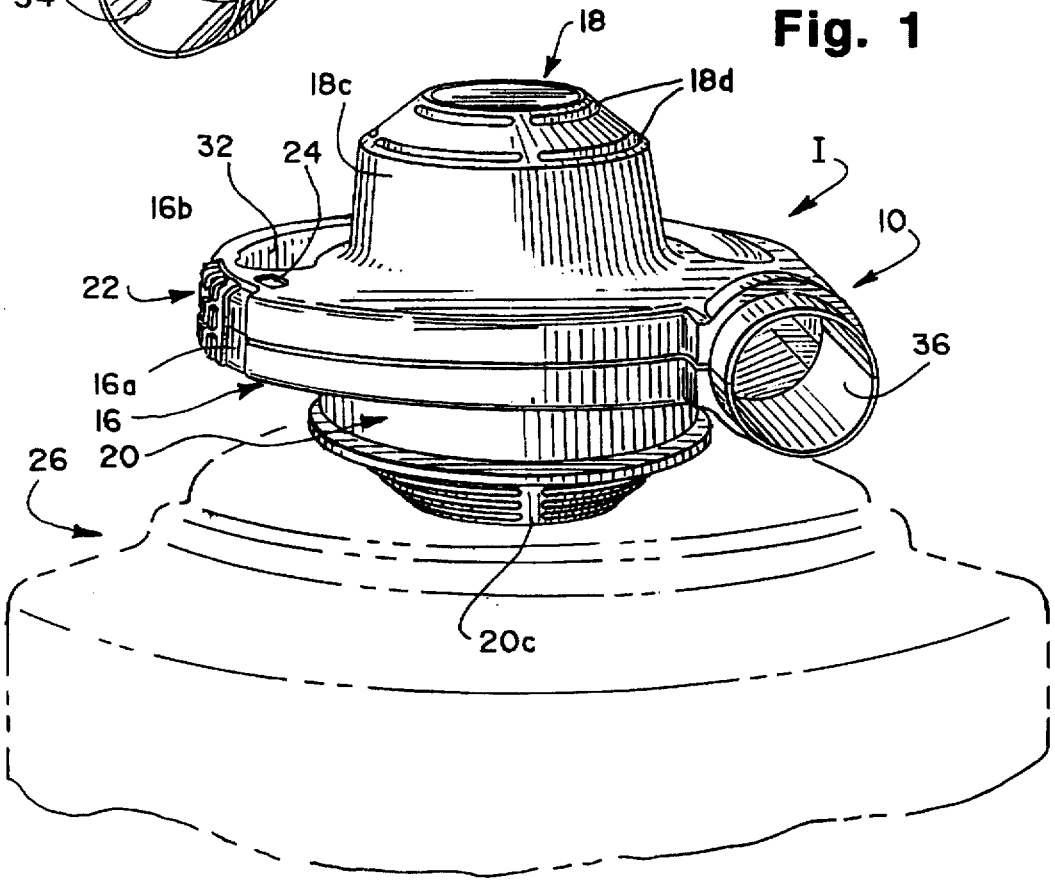
FIG. 1 is a fragmentary, perspective view of one embodiment of the improved electrical appliance operating with a container in a vacuum cleaner mode; the container is shown in phantom lines.

Referring to FIGS. 1 and 2, one embodiment of the improved electrical appliance 10 is shown respectively in two modes: a vacuum cleaner mode I and a blower mode II. The appliance includes a housing 16 formed of interfitting complemental sections 18, 20, and a switch assembly 22, the latter having a control unit 23 which is adjustable to three distinct positions: off, low and high. The control unit allows an operator to selectively control the electrical power to the appliance. The adjusted position of the unit 23 may be observed through an opening 24 located on an exposed side of housing section 18 when the appliance is in mode I While in mode I, the appliance 10 is horizontally secured in an overlying removable relation on the upper open end of a collecting container 26. A suction nozzle (not shown) is attached to a port (not shown) formed in the side of the container 26 to channel dirt and other debris into the container. In the blower mode II, however, the appliance 10 is detached from the container 26 and is designed to be hand held. A convenient handle 32 may be formed in the periphery of the housing 16. High velocity air is discharged through a tangentially disposed nozzle 34 formed in the periphery of the housing and spaced from the handle. When utilized in the vacuum cleaner mode I, the nozzle 34 is covered by a cap 36.

Figure 3:
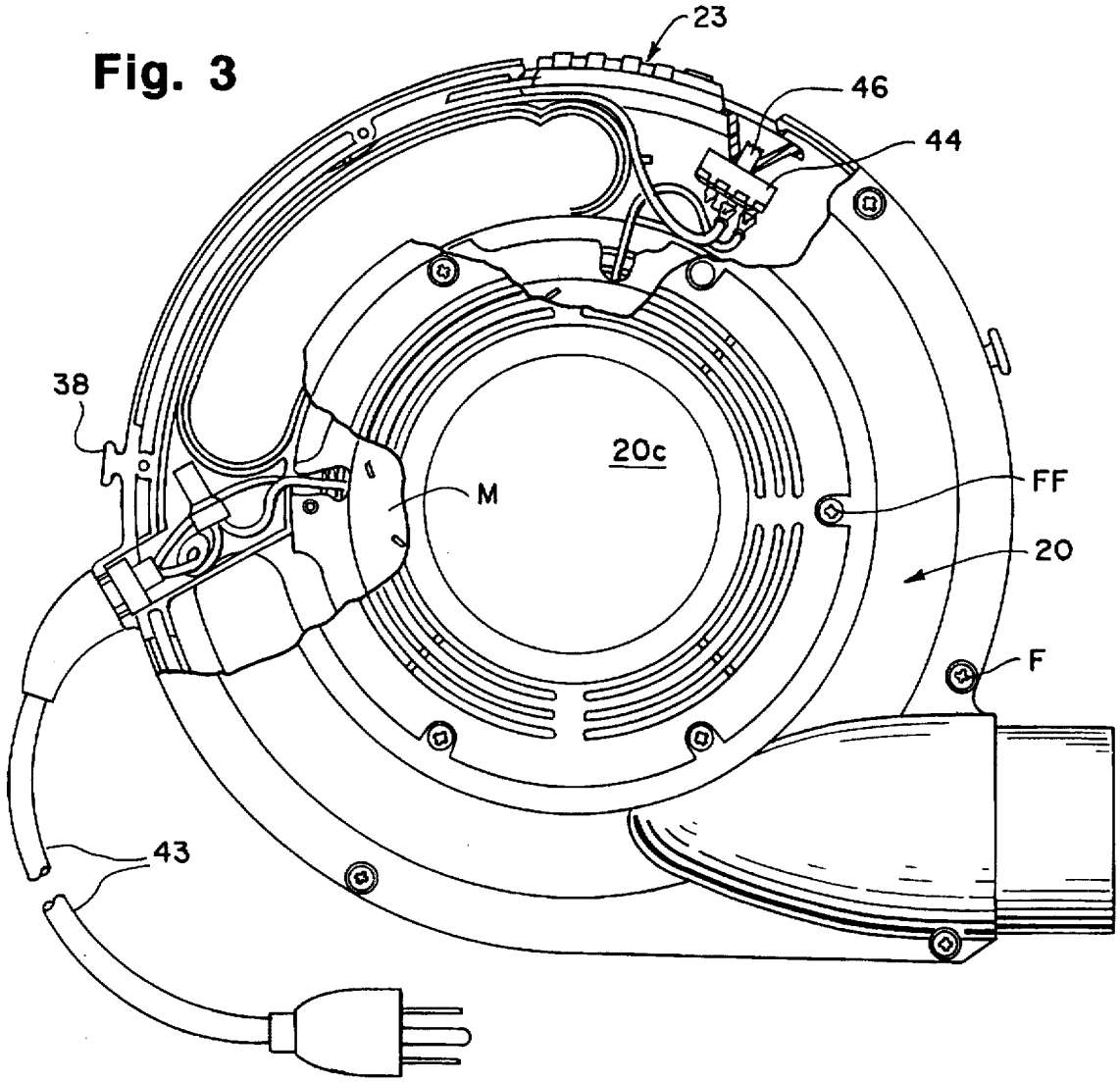
FIG. 3 is an enlarged back side elevational view of the appliance of FIG. 2 with a portion of the housing thereof cut away to show the switch and in partial section the control means therefor.
Figure 4:
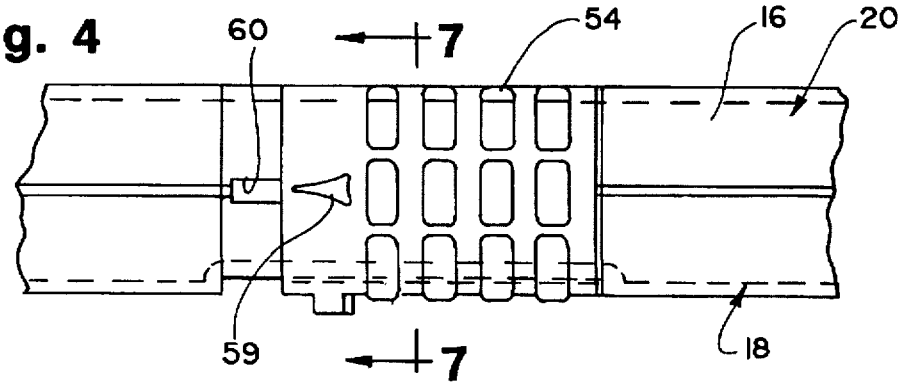
FIG. 4 is an enlarged fragmentary view of one exposed surface of the control means shown in FIG. 3.
Figure 5:
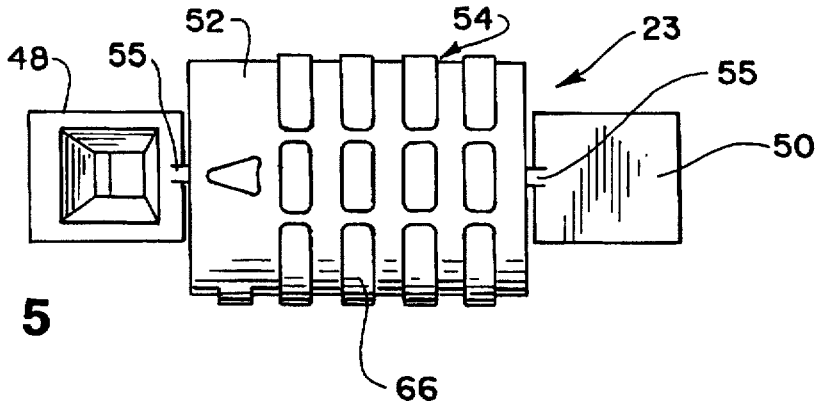
FIG. 5 is similar to FIG. 4 but showing the control means per se.
Figure 6:
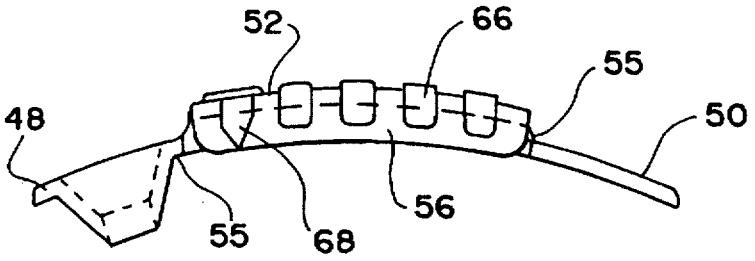
FIG. 6 is similar to FIG. 5 but showing a second exposed surface of the control means.

The housing may be provided with buttons, slots or rings 38 (as seen in FIG. 3) for attaching thereto a shoulder strap 40. A blower tube (not shown) may be attached to the blower nozzle 34 for greater directional control of the discharged air.

An electrical cord 43 connects the appliance 10 to an electrical power source. Cord 43 is provided with a conventional male plug. The improved switch assembly 22 is mounted on the housing in proximity to the handle 32. The assembly includes a switch 44 disposed within the housing and connected in series with an appliance motor M for selectively allowing the motor to be turned off or operated at two speed levels, low and high. The switch 44 may be a conventional three position type commercially available and includes a finger-like projection 46 adjustable between selected positions whereby there is no current, low current or high current flow through the switch.

The assembly 22 also includes the control unit 23, preferably of molded one piece construction, having an extension 48 at one end that is slidably disposed within the housing and snugly fits over the switch projection and effects adjustment thereof in response to the manual manipulation of the control unit 23. Extending from the opposite end of the unit is a plate-like extension 50 that is slidably disposed within the housing 16. The extensions 48 and 50 prevent the unit from becoming disassembled from the housing. Extensions 48 and 50 are interconnected to a center portion 52 by narrow neck segments 55. The center portion has an exposed finger-engageable first surface 54 and exposed second surface 56 angularly disposed with respect thereto. The neck segments 55 of unit 23, as seen in FIG. 7, are slidably disposed within an elongate guide slot 60 formed in the periphery of the housing when the sections thereof are in interfitting relation.

The control unit first surface 54 may be provided with an arrow 59 indicating the direction to move the control unit to one of the selected "on" positions. The unit 23 is contoured to conform substantially to the peripheral contour of the housing 16. Each exposed surface 54, 56 may include ridges or grooves 66 that provide a non-slip finger-engaging surface. The surface 56 may also be provided with a directional arrow 68.

The periphery of the housing in vicinity of the control unit 23 is recessed a small amount so that the exposed first and second surfaces of the unit are substantially flush with the adjacent exposed surfaces of the housing. The recessed peripheral portions 16a and 16b of the housing 16 are of greater length than the length of the unit central portion 52 thus, allowing selective longitudinal movement of the unit relative to the recessed portions 16a, 16b.

Figure 7:
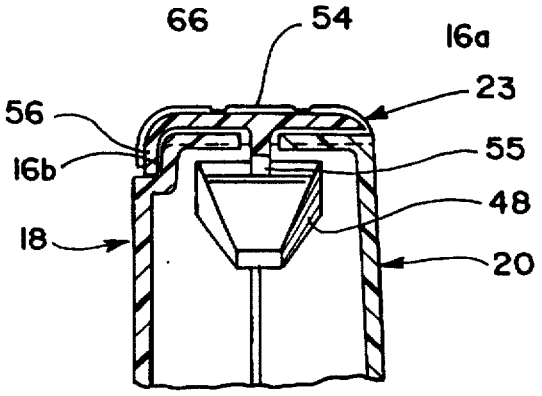
FIG. 7 is an enlarged, fragmentary sectional view taken along line 7—7 of FIG. 4.
Figure 11:
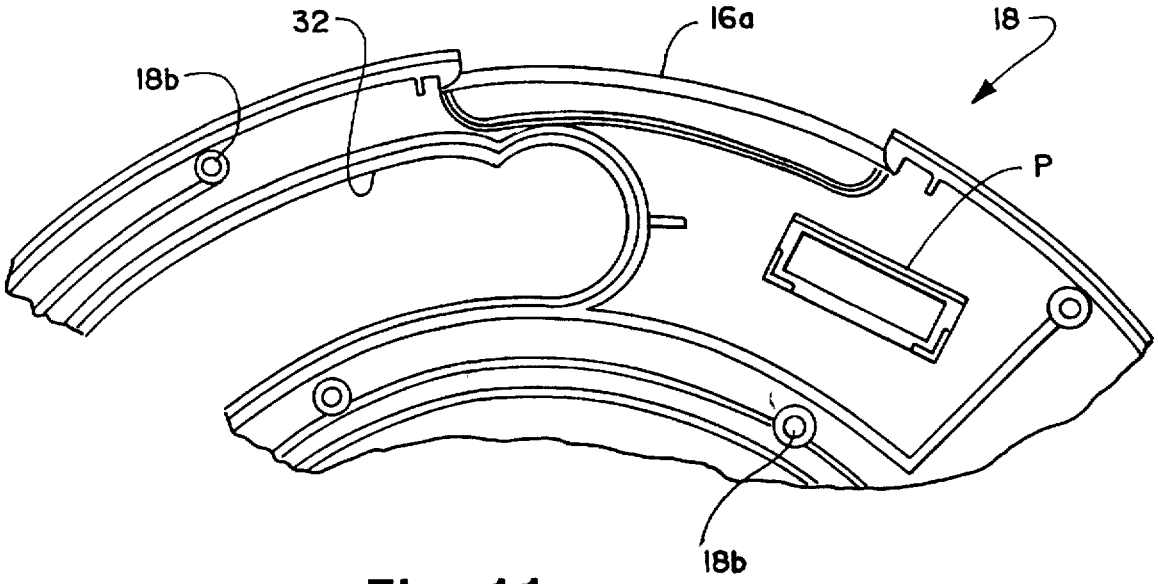
FIG. 11 is similar to FIG. 10 but of the housing section of FIG. 8.

As seen in FIG. 7, the relative angular disposition of the first and second surfaces of unit 23 is clearly shown. The first surface 54 is positioned in overlying relation with the housing recessed portion 16a so that it can be easily reached by an operator when gripping the handle 32. The second surface 56 overlies the housing recessed portion 16b and is situated for easy access by an operator when the device is being used in the vacuum cleaner mode I.

As seen in FIGS. 8–11, each housing section 18, 20 is preferably of one piece construction molded from a suitable plastic material. The interior surface 18a of section 18 is provided with an inwardly facing pocket P, see FIG. 8, which is sized to slidably accommodate a side portion of the switch 44. The interior surface 20a of housing section 20, which is opposite the pocket P when the housing sections are in interfitting relation, is provided with an inwardly projecting stud S, which abuts an opposite side portion of the switch. The stud and pocket cooperate with one another to sandwich the switch 44 therebetween. Thus, no separate fasteners are required to secure the switch within the housing, thereby facilitating assembly and servicing of the appliance.

Suitable threaded openings 18b and 20b are symmetrically arranged about the housing sections 18 and 20 and are adapted to accommodate screw fasteners F and FF see FIG. 3. Fasteners F and some of the fasteners FF retain the housing sections 18 and 20 in interfitting relation. The remaining fasteners FF serve to secure the electric motor M to the interior of a center portion 18c of the housing section 18. As seen in FIGS. 1 and 2, the center portion 18c of the housing section 18 is offset outwardly so as to accommodate the motor M disposed within the housing. The center portion 18c is provided with ventilating slots 18d. Housing section 20, in turn, has an outwardly offset, louvered center portion 20c in which may be disposed a filter, not shown.

While the appliance 10 has heretofore been described as functioning in either a vacuum cleaner mode or a blower mode, it is not intended to be limited thereto. The shape and size of the appliance may vary from that shown and will depend upon its intended purpose. In any case the improved appliance is of simple, compact, lightweight yet sturdy construction; has a minimum number of components which may be readily assembled; and incorporates a control unit which may be easily manipulated manually regardless of the mode in which the appliance is being operated.

We claim:

1. An electrical appliance operable in various modes, comprising:

a housing having first and second exterior surface portions;

switch means disposed within the housing for opening and closing an electrical circuit for the appliance; and manually adjustable control means operatively connected to said switch means for selective manual adjustment between first and second positions to effect opening and closing said electrical circuit; said control means having a unitary control member with first and second exposed surfaces in angularly disposed relation, said first surface overlying said first exterior portion of said housing and being oriented for selective manual adjustment between said first and second positions when said appliance is in a first operating mode and said second surface overlying said second exterior portion of said housing and being oriented for selective manual adjustment between said first and second positions when said appliance is in a second operating mode.

2. The appliance of claim 1 wherein the first and second surfaces are in substantially perpendicular relation.

3. The appliance of claim 1 wherein the switch means includes an adjustable projection disposed within the housing interior and the control means includes a segment disposed the housing interior and engaging said projection and effecting adjustment thereof in response to the manual adjustment of said control means.

4. The appliance of claim 1 wherein said control means is provided with a plurality of circuit controlling positions, each of the latter positions regulating the electrical energy flow through the switch means.

5. An electrical appliance operable in various modes, comprising:

switch means for opening and closing an electrical circuit for the appliance;

a housing having a pair of interfitting sections, one section being provided with an interior means for accommodating a first exterior portion of the switch means, and the other housing section being provided with an interior means for engaging a second exterior portion of the switch means, the interior means cooperating with one another when the housing sections are in interfitting relation to fixedly retain the switch means in a predetermined location within the housing interior, said pair of interfitting sections defining first and second exterior surface portions of said housing; and manually adjustable control means operatively connected to said switch means for selective adjustment between first and second positions to effect opening and closing said electrical circuit; said control means having a unitary control member with first and second exposed surfaces in angularly disposed relation, said first surface overlying said first exterior portion of said housing and being oriented for selective manual adjustment between said first and second portions when said appliance is in a first operating mode and said second surface overlying said second exterior portion of said housing and being oriented for selective manual adjustment between said first and second positions when said appliance is in a second operating mode.

6. In an electrical appliance operable in various operating modes, and being provided with a housing having intermitting sections providing first and second exterior peripheral segments disposed in substantially orthogonal planes, the improvement comprising a switch assembly mountable on the appliance housing, said assembly including:

a switch means disposed within the housing for selectively moving between first and second positions to control an electrical circuit to the appliance; and manually adjustable control means mountable on the housing and operatively connected to said switch means, said control means being selectively adjustable between said first and second positions, said switch means being responsive to the movement of said control means between said first and second positions; said control means including a center portion having exposed finger engagable first and second surfaces, said first surface overlying the first peripheral segment of the housing exterior and being readily accessible to effect movement of said control means between said first and second positions when the appliance is in a first operating mode and said second surface overlying the second peripheral segment of the housing exterior and being readily accessible to effect movement of said control means between said first and second positions when the appliance is in a second operating mode.

7. The switch assembly of claim 6 wherein the first and the second exposed surfaces are in angularly disposed relation and are adapted to be in close proximity to a handle formed on the exterior of the housing.

8. The switch assembly of claim 7 wherein the control means includes an extension disposed at one end of the center portion; said extension being positionable within the housing interior and engagable with an adjustable protruding actuator element of the switch means, adjustment of said actuator element being in response to the movement of the control means.

9. The appliance of claim 6 wherein the switch means is provided with a plurality of circuit closing positions and the control means is selectively adjustable to a corresponding number of on positions.

*10. An electrical appliance comprising:*

*a motor;*

*a switch for controlling an electrical circuit supplying current to the motor, the switch including an actuator having at least two operative positions;*

*a housing containing the motor and the switch, the housing having a pair of interfitting sections, one section being provided with an inwardly facing pocket sized to accommodate a first exterior portion of the switch, and the other housing section being provided with an inwardly projecting stud disposed opposite the inwardly facing pocket, the inwardly projecting stud engaging a second exterior portion of the switch, the first exterior portion of the switch being opposite the second exterior portion of the switch, the inwardly facing pocket and the inwardly projecting stud cooperating when the housing sections are in interfitting relation to fixedly retain said switch in a predetermined location within the housing; and,*

*a manually engageable control projection coupled to the actuator of the switch and being manually engageable from outside the housing to permit a user to move the actuator between the at least two operative positions.*

*11. An electrical appliance as defined in claim 10 wherein the housing includes a handle for transporting the appliance, the switch being disposed in the handle.*

*12. An electrical appliance as defined in claim 10 wherein the switch is contained completely within the housing, and the manually engageable control projection includes a manually engageable surface accessible from outside the housing and an extension which couples the manually engageable surface to the actuator within the housing.*

*13. An appliance capable of being used in a first mode and a second mode, the appliance being adapted for being horizontally secured in overlying removable relation on the upper end of a collection container for use as a vacuum cleaner in the first mode, and further being adapted to be detached from the collection container and hand held as a blower in a second mode, the appliance comprising:*

*a motor;*

*a switch for controlling an electrical circuit supplying current to the motor, the switch including an actuator having at least two operative positions;*

*a housing containing the motor and the switch, the housing having a pair of interfitting sections, one section being provided with an inwardly facing pocket sized to accommodate a first exterior portion of the switch, and the other housing section being provided with an inwardly projecting stud disposed opposite the inwardly facing pocket, the inwardly projecting stud engaging a second exterior portion of the switch, the first exterior portion of the switch being opposite the second exterior portion of the switch, the inwardly facing pocket and the inwardly projecting stud cooperating when the housing sections are in interfitting relation to fixedly retain said switch in a predetermined location within the housing; and,*

*a manually engageable control projection coupled to the actuator of the switch and being manually engageable from outside the housing to permit a user to move the actuator between the at least two operative positions.*

*14. An appliance as defined in claim 13 wherein the housing includes a handle for transporting the appliance when used in the second mode, the switch being disposed in the handle.*

*15. An appliance as defined in claim 13 wherein the switch is contained completely within the housing, and the manually engageable control projection includes a manually engageable surface accessible from outside the housing and an extension which couples the manually engageable surface to the actuator within the housing.*

* * * * *